2,733,258

PREPARATION OF ISOMERIC 1-PHENYL-1,2-DICYANOETHYLENES

Delton William Hein, Somerville, N. J., assignor to American Cyanamid Company, New York, N. Y., a corporation of Maine No Drawing. Application August 17, 1953, Serial No. 374,833

6 Claims. (Cl. 260—465)

This invention relates to a novel process of preparing isomeric 1-phenyl-1,2-dicyanoethylenes which are valuable intermediates for the preparation of pigments and dyestuffs.

The only synthesis of phenylmaleonitrile described in the literature, of which I am aware, is one involving a number of steps which not only are difficult to carry out but which result in very poor yields. Gitsels and Wibaut, Rec. Trav. Chim. 59, 1093–1103 (1940) describe the preparation of phenylsuccinonitrile involving brominating cinnamic acid, dehydrohalogenating the product to form phenylpropiolic acid, esterifying the phenylpropiolic acid, and adding two molecules of HCN to the ester with accompanying decarboxylation. The resulting phenylsuccinonitrile may thereafter be converted to phenylmaleonitrile by the action of sulfuryl chloride, as described by Mowry, U. S. Patent No. 2,447,813.

The above described synthesis involves difficult manipulations at several of the steps and results in poor yields of phenylsuccinonitrile, only amounting to about 20% of theory.

In accordance with the present invention, I have discovered a novel method of preparing isomeric 1-phenyl-1,2-dicyanoethylenes which produces surprisingly good yields and at the same time is easy to manipulate. I have found that when 1-phenyl-2-hydroxysuccinonitrile (Keller, Helv. Chim. Acta 20, 436 (1937)) is utilized as the starting material, the synthesis of the products of this invention can be easily carried out and with good yields. The reactions involved in producing 1-phenyl-2-hydroxysuccinonitrile may be illustrated as follows:

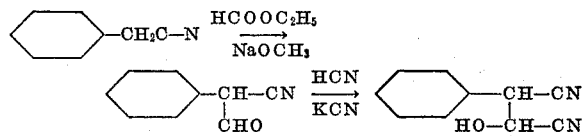

According to the present invention, the 1-phenyl-2-hydroxysuccinonitrile is converted by the action of an anhydride of a lower alkanoic acid to an ester, and the ester is thereafter decomposed in the presence of activated alumina to form a mixture of the two isomers, phenylmaleonitrile and phenylfumaronitrile, as illustrated as follows:

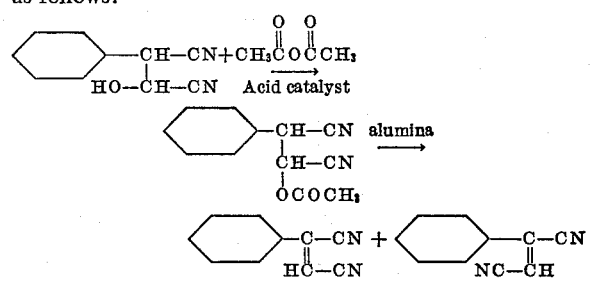

It is a surprising feature of the present invention that the elimination of the alkanoic acid and the formation of the double bond occur so easily and the present invention is not limited to any theoretical explanation of why this takes place. In contrast thereto, I have observed that the 1-alkanoyloxy derivatives of other saturated 1,2-dinitriles are quite stable and require drastic conditions to effect the formation of the double bond.

The 1-phenyl-2-hydroxysuccinonitrile can be isolated as described by Keller and used directly in the preparation of the isomeric nitriles as outlined above. It is a further advantage of the present invention, however, that such isolation is not necessary. Instead, the 2-phenyl-2-cyanoacetaldehyde may be condensed with HCN and the resulting 1-phenyl-2-hydroxysuccinonitrile then reacted with the alkanoic anhydride in the presence of acid to form the corresponding alkanoyloxy compound, which may thereafter either be isolated and dissolved in a suitable solvent for reaction with the activated alumina, or the ester need not be isolated but the reaction mixture may be treated with activated alumina directly. In either case, the reaction gives an almost quantitative yield of a mixture of equal parts of phenylmaleonitrile and phenylfumaronitrile.

Alkanoic anhydrides which can be used in this reaction are the anhydrides of the lower alkanoic acids having less than six carbon atoms and thus include anhydrides such as acetic anhydride, propionic anhydride, butyric anhydride, isobutyric anhydride, and caproic anhydride. Because of availability, the preferred reagent is acetic anhydride. The quantity of alkanoic anhydride used should be at least stoichiometric, obviously, but excesses do not interfere with the reaction and are, in fact, desirable in order to provide a reaction medium. Quantities less than stoichiometric will give incomplete reaction. Too large an excess should be avoided in order to prevent over dilution of the reaction.

As acid catalysts for the preparation of the ester, I may use any strong mineral acid which can be used to catalyze the esterification of an alcohol, such as sulfuric acid, phosphoric acid, hydrochloric acid, hydrobromic acid and the like. The use of sulfuric acid is preferred, however, because of ease of handling. The amount of acid used should be catalytic in order to prevent any of the nitrile groups from being hydrolyzed.

The reaction in the presence of activated alumina to form the double bond can be carried out either in the acid reaction medium in which the esterification has taken place or more preferably the isolated ester can be dissolved in another solvent, for example, benzene, for this reaction. The alumina can be added to either reaction mixture as a powder, or can be packed into a column, through which the reaction mixture is passed. The latter method constitutes a preferred embodiment since it also simultaneously effects the separation of the two isomeric 1-phenyl-1,2-dicyanoethylenes. In either case, the reaction is exothermic and, normally heat need not be applied externally. The reaction in a column occurs in a narrow band which progresses down the column as the alumina reacts with the alkanoic acid released. Sufficient alumina (i. e., stoichiometric quantities) must be used to take up the released alkanoic acid regardless of whether a column is used or not. If a column is used and the separation of the isomers is desired, a large excess of alumina is necessary for the chromatographic separation. Separation of the isomers can also be effected by other means, such as by distillation or by fractional crystallization.

The invention will be described in greater detail in conjunction with the following specific examples in which the parts are by weight unless otherwise specified.

*Example 1*

149.5 parts of 2-phenyl-2-cyanoacetaldehyde (prepared by the reaction of ethylformate and sodium methoxide on benzylcyanide) is added to 105 parts of liquid hydrogen cyanide which has been distilled from its stabilizer and recondensed. To this is added one part of finely-divided potassium cyanide. The mixture is stirred with external cooling until the reaction is substantially complete. Two parts of concentrated sulfuric acid is added and the excess HCN is distilled out under reduced pressure. 153 parts of acetic anhydride is then added. The mixture heats up spontaneously. The mixture is stirred until the phenylhydroxysuccinonitrile has completely reacted. The excess acetic anhydride is then destroyed by the addition of water and the aqueous layer is decanted. The residual oil is dissolved in 1000 parts of ether, washed free of acetic acid, and evaporated. A nearly quantitative yield of 1-phenyl-2-acetoxysuccinonitrile is obtained.

*Example 2*

The product of Example 1 is dissolved in five times its weight of benzene and the solution is stirred while three times its weight of powdered activated alumina is added slowly. The suspension heats up a little. It is stirred until the reaction is substantially complete. The alumina is removed by filtration and washing with benzene. The filtrate and washings are evaporated to give a good yield of the isomeric mixture of phenylfumaronitrile and phenylmaleonitrile.

*Example 3*

The procedure of Example 1 is followed substituting an equivalent amount of butyric anhydride for the acetic anhydride. The phenylbutyroxysuccinonitrile is similarly isolated. By treating this product with activated alumina in the manner described in Example 2, the same mixture of isomeric phenyldicyanoethylenes is prepared.

Similarly, phenylpropionoxysuccinonitrile can be prepared by acylating with propionic anhydride and can be decomposed to the same isomeric mixture.

*Example 4*

Ten parts of 1-phenyl-2-acetoxysuccinonitrile, prepared as in Example 1, is dissolved in 31 parts of benzene and chromatogrammed through an activated alumina column. It is eluted with benzene. About 300 parts by volume of eluate is collected and allowed to evaporate. The column heats up considerably (60–70° C.) as the solution passes through. The eluate is collected in fractions. From the earliest fractions through the column there is obtained on evaporation phenylfumaronitrile, M. P. 42–43° C. The last fractions yield pure phenylmaleonitrile, M. P. 86–87° C. If the separated isomers are not required, the mixture can be obtained in good yield by evaporation of the total eluate.

I claim:

1. The method of preparing isomeric 1-phenyl-1,2-dicyanoethylenes which comprises reacting 1-phenyl-2-hydroxysuccinonitrile with at least a stoichiometric quantity of an anhydride of a lower alkanoic acid in the presence of an acid catalyst so as to form the corresponding ester, and decomposing the ester with activated alumina so as to produce phenylmaleonitrile and phenylfumaronitrile.

2. The method according to claim 1 in which the anhydride is acetic anhydride.

3. The method according to claim 1 in which the reaction with activated alumina is carried out in a packed column whereby separation of the isomers is effected.

4. The method of preparing isomeric 1-phenyl-1,2-dicyanoethylenes which comprises reacting a 1-phenyl-2-lower-alkanoyloxysuccinonitrile with activated alumina so as to produce phenylmaleonitrile and phenylfumaronitrile.

5. The method according to claim 4 in which the 1-phenyl - 2 - lower - alkanoyloxysuccinonitrile is 1 - phenyl-2-acetoxysuccinonitrile.

6. The method according to claim 5 in which the reaction with activated alumina is carried out in a packed column whereby separation of the isomers is effected.

References Cited in the file of this patent

UNITED STATES PATENTS

| | | |
|---|---|---|
| 2,183,357 | Dunbar et al. | Dec. 12, 1939 |
| 2,264,025 | Gudgeon et al. | Nov. 25, 1941 |
| 2,444,882 | Tawney | July 6, 1948 |
| 2,447,813 | Mowry | Aug. 24, 1948 |
| 2,452,672 | Miller et al. | Nov. 2, 1948 |